(12) United States Patent
Ishikawa

(10) Patent No.: US 7,918,036 B2
(45) Date of Patent: Apr. 5, 2011

(54) SURFACE SHAPE MEASURING APPARATUS AND SURFACE SHAPE MEASURING METHOD

(75) Inventor: Yasunari Ishikawa, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 289 days.

(21) Appl. No.: 12/309,132

(22) PCT Filed: May 21, 2008

(86) PCT No.: PCT/JP2008/059757
§ 371 (c)(1),
(2), (4) Date: Jan. 6, 2009

(87) PCT Pub. No.: WO2009/004872
PCT Pub. Date: Jan. 8, 2009

(65) Prior Publication Data
US 2009/0300930 A1    Dec. 10, 2009

(30) Foreign Application Priority Data
Jun. 29, 2007  (JP) ................................. 2007-172955

(51) Int. Cl.
*G01B 5/20* (2006.01)
*G01B 5/28* (2006.01)
(52) U.S. Cl. .............................. 33/559; 33/503; 702/168
(58) Field of Classification Search ................. 33/1 M, 33/503, 556, 558, 559, 561; 702/94, 95, 702/168
See application file for complete search history.

(56) References Cited

U.S. PATENT DOCUMENTS

| | | | | |
|---|---|---|---|---|
| 6,460,261 | B1 * | 10/2002 | Noda et al. | 33/503 |
| 7,039,550 | B2 * | 5/2006 | Noda | 702/168 |
| 7,685,726 | B2 * | 3/2010 | Fuchs et al. | 33/503 |
| 7,734,445 | B2 * | 6/2010 | Negishi | 702/168 |
| 7,809,523 | B2 * | 10/2010 | Hunter et al. | 702/168 |
| 7,852,031 | B2 * | 12/2010 | Hon et al. | 318/572 |

(Continued)

FOREIGN PATENT DOCUMENTS

JP    5-34145    2/1993

(Continued)

OTHER PUBLICATIONS

Patent Abstracts of Japan, Publication No. 05034145 A, Published on Feb. 9, 1993, in the name of Inagaki et al.
Patent Abstracts of Japan, Publication No. 05-231806, Published on Sep. 7, 1993, in the name of Yagi.

(Continued)

*Primary Examiner* — Amy Cohen Johnson
(74) *Attorney, Agent, or Firm* — Christie, Parker & Hale LLP

(57) ABSTRACT

In a surface shape measurement device that measures the surface shape of a sample (W1, W2) by moving a probe (16, 26) in a sliding fashion along the surface of the sample (W1, W2) and thereby detecting the amount of displacement of the probe (16, 26) caused by irregularities on the surface, an initial amount of displacement is detected which is the amount of displacement of the probe (16, 26) when the probe is first placed in contact with a measurement start point on the surface of the sample (W1, W2), and the amount of displacement of the probe (16, 26), detected as it is moved in a sliding fashion along the surface, is compared with the initial amount of displacement to determine whether the probe (16, 26) has reached a measurement end point.

10 Claims, 11 Drawing Sheets

U.S. PATENT DOCUMENTS

| | | |
|---|---|---|
| 2002/0038854 A1 | 4/2002 | Enomoto |
| 2004/0107073 A1 | 6/2004 | Sakurada et al. |
| 2010/0217561 A1* | 8/2010 | Mills .............................. 702/168 |

FOREIGN PATENT DOCUMENTS

| | | |
|---|---|---|
| JP | 5-231806 | 9/1993 |
| JP | 2002-107144 | 4/2002 |
| JP | 2004-191365 | 7/2004 |
| JP | 2007-121146 | 5/2007 |

OTHER PUBLICATIONS

Patent Abstracts of Japan, Publication No. 2002-107144, Published on Apr. 10, 2002, in the name of Enomoto.

Patent Abstracts of Japan, Publication No. 2004191365 A, Published on Jul. 8, 2004, in the name of Sakurada et al.

Patent Abstracts of Japan, Publication No. 2007121146 A, Published on May 17, 2007, in the name of Togawa et al.

* cited by examiner

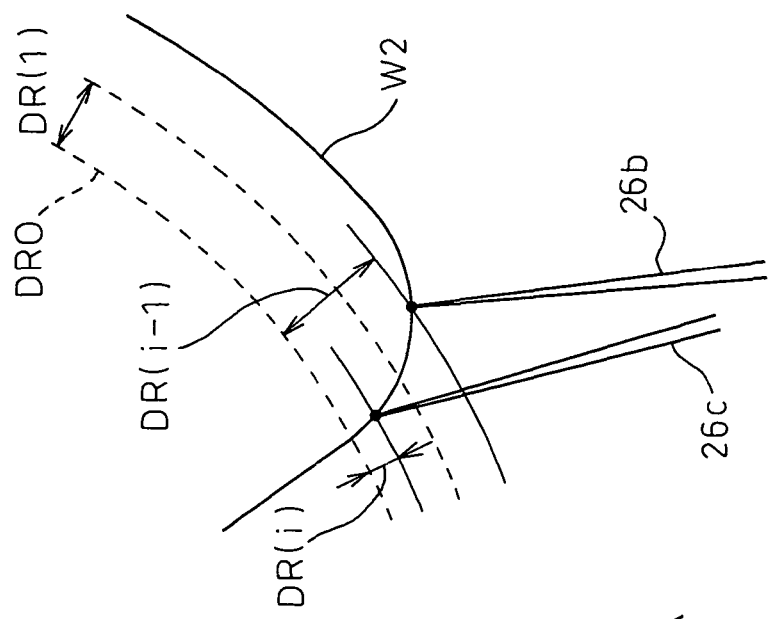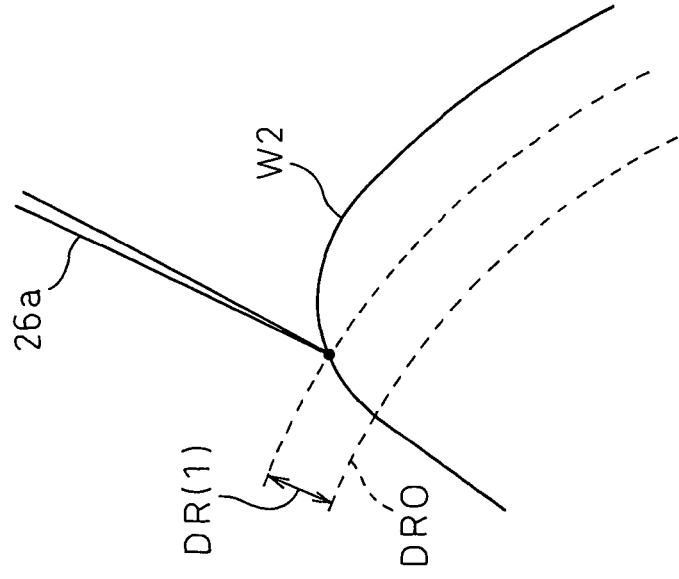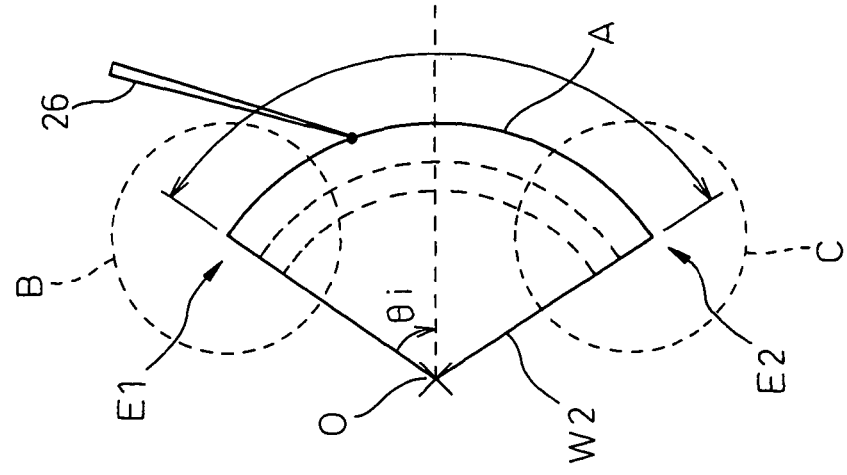

SURFACE SHAPE MEASURING APPARATUS AND SURFACE SHAPE MEASURING METHOD

CROSS-REFERENCE TO RELATED APPLICATION

This application is a National Phase Patent Application and claims the priority of International Application Number PCT/JP2008/059757, filed on May 21, 2008, which claims priority of Japanese Patent Application Number 2007-172955, filed on Jun. 29, 2007.

TECHNICAL FIELD

The present invention relates to a surface shape measuring apparatus, such as a surface roughness/shape measuring apparatus or a roundness measuring apparatus, that measures the surface shape of a sample by moving a probe in a sliding fashion along the surface of the sample and thereby detecting the amount of displacement of the probe caused by irregularities on the surface. More specifically, the invention relates to a technique for determining the measurement end point on the surface of the sample at which the sliding movement of the probe is to be stopped in the surface shape measurement.

BACKGROUND ART

A surface roughness/shape measuring apparatus or a roundness measuring apparatus (in this specification, such measuring apparatus will be generically referred to as "surface shape measuring apparatus") measures the surface shape of a measurement object (workpiece) by moving a displacement detector (pickup) equipped with a probe along the surface of the measurement object and by converting the amount of displacement of the probe into an electrical signal which is read into a computer or the like for processing. FIG. 1A shows the basic configuration of such a surface roughness/shape measuring apparatus (refer to patent document 1 listed below).

The surface roughness/shape measuring apparatus 10 measures the surface shape of a workpiece W1 by traversing a stylus 16, i.e., a probe, in the X-axis direction across the surface of the workpiece W1 placed on a work table 17 and thereby detecting, using a displacement detector (pickup) 15, the amount of displacement of the stylus 16 in the Z-axis direction caused by surface irregularities of workpiece W1.

A column 12 is installed vertically on a base 11 placed in a horizontal position. A Z-direction moving part 13 is slidably supported on the column 12, and is moved up and down in the vertical direction by a Z-direction driving means not shown.

An X-arm 14 is supported horizontally on the Z-direction moving part 13. The X-arm 14 is moved forward and backward along the X-axis direction by an X-arm driving means not shown. The displacement detector 15 is attached to the tip of the X-arm 14. With the X-arm 14 moving forward and backward along the X-axis direction, the stylus 16 moves in reciprocating fashion along the X-axis.

The plane where the surface of the base 11 lies is taken as the X-Y plane, and the straight line along which the stylus 16 moves in the X-Y plane is taken as the X-axis. Further, the straight line perpendicular to the X-axis in the X-Y plane is taken as the Y-axis, and the straight line passing through the intersection (origin O) of the Y- and X-axes and oriented perpendicular to the X-Y plane is taken as the Z-axis. The thus defined rectangular space coordinate system is called the O-XYZ coordinate system.

When the stylus 16 is moved along the X-axis while pressing it against the surface of the workpiece W1 by applying a constant force, the stylus 16 is displaced in the Z direction because of the surface irregularities of the workpiece W1. The amount of displacement of the stylus 16 is converted into an electrical signal by a sensor, such as a differential transducer, built into the displacement detector 15.

FIG. 1B is a diagram explaining the amount of displacement detected by the displacement detector 15. The signal value that the displacement detector 15 outputs indicates how far the stylus 16 is elevated as it contacts the workpiece W1. Since the amount of elevation of the stylus 16 differs depending on the relative positional relationship in the Z direction between the workpiece W1 and the displacement detector 15 holding the stylus 16, the amount of displacement, $Z_i$, of the stylus 16 detected by the displacement detector 15 is given as the amount of offset from a reference position ($Z_0$) in the Z direction, which is determined in accordance with the position of the displacement detector 15.

The electrical signal output from the displacement detector 15 is converted by an A/D converter into a digital signal, which is input to a data processing apparatus such as a computer (not shown). In this way, measurement data indicating the surface roughness or surface shape of the workpiece is acquired by the data processing apparatus.

The work table 17 is moved in the Y-axis direction by a work table driving means not shown. By moving the work table 17 in the Y-axis direction, the surface roughness or surface shape of the workpiece W1 can be measured in the X-Y plane by changing the traverse position of the stylus 16 across the surface of the workpiece W1.

FIG. 2A is a diagram showing the basic configuration of a roundness measuring apparatus for measuring the roundness of a cross-sectional shape of a workpiece W2 at least a portion of whose circumference is formed in an arc shape in cross section (see patent document 2 listed below).

When the roundness measuring apparatus 20 measures the arced portion of the cross-sectional circumference of the workpiece W2, the workpiece W2 is placed on a turntable 27 having an axis of rotation oriented parallel to the Z-axis as shown. Then, with the probe 26 pressed against a side face of the workpiece 2, the workpiece W2 is rotated about the center of the arc formed along the cross-sectional circumference of the workpiece W2, thus causing the tip of the probe 26 to trace the circumferential face of the workpiece W2. Since the tip of the probe 26 is displaced as the radius of the arced portion of the cross-sectional circumference of the workpiece W2 changes, the roundness of the arced portion of the cross-sectional circumference of the workpiece W2 can be measured by measuring the change in the amount of displacement.

A column 22 is installed vertically on a base 21 placed in a horizontal position. A Z-direction moving part 23 is slidably supported on the column 22, and is moved up and down in the vertical direction by a Z-direction driving means not shown.

An X-arm 24 is supported horizontally on the Z-direction moving part 23. The X-arm 24 is moved along the X-axis direction by an X-arm driving means not shown. A displacement detector 25 is attached to the tip of the X-arm 24. Then, by moving the Z-direction moving part 23 and hence the X-arm 24, the displacement detector 25 is positioned, and the stylus 26 attached to the displacement detector 25 is brought into contact with the side face of the workpiece W2 placed on the turntable 27.

When the workpiece W2 is rotated while pressing the stylus 26 against the side face of the workpiece W2, the position of the tip of the stylus 26 is displaced in the radial direction of the arc as the radius of the arc formed along the cross-sectional circumference of the workpiece W2 changes. The amount of displacement of the stylus 26 is converted into an electrical signal by a sensor, such as a differential transducer, built into the displacement detector 25.

FIG. 2B is a diagram for explaining the amount of displacement detected by the displacement detector 25. The signal value that the displacement detector 25 outputs indicates how far the stylus 26 pressed against the side face of the workpiece W2 is displaced outwardly in the radial direction of the arc of the side face as the stylus 26 contacts the workpiece W2. Since the amount of outward displacement of the stylus 26 differs depending on the relative positional relationship between the workpiece W2 and the displacement detector 25, the amount of displacement, DRi, of the stylus 26 detected by the displacement detector 25 is given as the amount of offset from a reference radius (DR0), which is determined in accordance with the position of the displacement detector 25.

The electrical signal output from the displacement detector 25 is converted by an A/D converter into a digital signal, which is input to a data processing apparatus such as a computer (not shown). Then, based on the input signal, the data processing apparatus computes the circumferential shape of the cross section of the workpiece W2 to determine the roundness of the arced portion.

[Patent document 1] Japanese Unexamined Patent Publication No. 2002-107144

[Patent document 2] Japanese Unexamined Patent Publication No. H05-231806

DISCLOSURE OF THE INVENTION

The operator who operates the above surface shape measuring apparatus needs to indicate to the apparatus the range over which the probe is to be moved in sliding fashion along the surface of the sample, i.e., the measurement range. In the prior art, this has been done by specifying the sliding movement starting point SP of the probe 16 and the sliding movement length L on the surface of the workpiece W1, as shown in FIG. 3A. In this case, the operator has had to specify the sliding movement length L so that the designated measurement range R can be exhaustively scanned by the probe 16.

As a result, when measuring the surfaces of workpieces differing in size or shape one after another, the operator has had to specify the sliding movement length L over again for each workpiece, and the operation for such specification has made the measurement work very laborious.

One possible method to avoid such a laborious operation would be to set a suitable threshold value for the output value of the displacement detector and to automatically control the apparatus so that when the output value of the displacement detector exceeds the threshold value, the measurement is stopped by determining that the probe has been moved beyond the measurement range. For example, as shown in FIG. 3B, when measuring the surface shape of the workpiece W1 having edges E1 and E2, if the probe 16 has moved past the edge E2 and gone off the workpiece W1, and the displacement of the probe 16 has decreased below its lower limit Zth, then it is determined that the measurement range is exceeded.

With this method; however if the probe 16 has gone off the surface of the workpiece, the measurement operation cannot be stopped immediately by detecting this out-of-range condition. As a result, when measuring the surface roughness of a thin workpiece such as a piston ring, for example, the probe 16 may be dropped onto the work table, damaging or contaminating the tip of the probe 16.

Such measurement stop action that allows the probe to go off the surface of the workpiece also becomes a problem in the roundness measuring apparatus, i.e., when moving the probe 26 along the side face of a workpiece W2 having a cut portion C such as shown in FIG. 4, if the workpiece W2 continues to be rotated in the direction of the arrow with the probe 26 falling into the cut portion C, the probe 26 may be broken by hitting the edge E.

The present invention has been devised in view of the above problems, and an object of the invention is to enhance the measurement work efficiency by eliminating the need to specify the measurement length when measuring the surface shapes of workpieces having different measurement ranges.

To achieve the above object, in the surface shape measurement according to the present invention, when measuring the surface shape of a sample by moving a probe in sliding fashion along the surface of the sample and thereby detecting the amount of displacement of the probe caused by irregularities on the surface, an initial amount of displacement is detected which is the amount of displacement of the probe when the probe is first placed in contact with a sliding movement start point on the surface of the sample, and the amount of displacement of the probe, detected as it is moved in sliding fashion along the surface, is compared with the initial amount of displacement to determine whether the probe has reached a measurement end point.

In this way, by monitoring the amount of displacement of the probe detected during the measurement and determining whether the probe has reached the measurement end point, the measurement work can be simplified by eliminating the need to specify the measurement length required in the prior art.

Further, by determining whether the probe has reached the measurement end point by referring to the initial amount of displacement which is the amount of displacement of the probe detected at the measurement start point, the measurement operation can be stopped upon detecting the amount of displacement substantially equal to that detected at the measurement start point. With this arrangement, when measuring the surface shape of the workpiece having edges as in the earlier described example, the sliding movement of the probe can be stopped before the probe is moved outside the edge.

Further, the determination as to whether the probe has reached the measurement end point may be invalidated until the probe is moved up to a predetermined distance from the start of the sliding movement. By thus invalidating the determination, it becomes possible to avoid an erroneous determination that the measurement end point has been reached immediately after the start of the measurement.

According to a first mode of the present invention, there is provided a surface shape measuring apparatus which measures a surface shape of a sample by moving a probe in sliding fashion along a surface of the sample and thereby detecting the amount of displacement of the probe caused by irregularities on the surface. The surface shape measuring apparatus comprises: a displacement detector which detects the amount of displacement of the probe; and a measurement end determining unit which determines whether the probe has reached a measurement end point by comparing the amount of displacement of the probe, detected as the probe is moved in sliding fashion along the surface of the sample, with an initial amount of displacement of the probe detected when the probe was first placed in contact with a measurement start point on the surface.

According to a second mode of the present invention, there is provided, in a surface shape measurement that measures a surface shape of a sample by moving a probe in sliding fashion along a surface of the sample and thereby detecting the amount of displacement of the probe caused by irregularities on the surface, a measurement end determining method for determining whether the probe being moved in sliding fashion along the surface of the sample has reached a measurement end point. In this determining method, an initial amount of displacement is detected which is the amount of displacement of the probe when the probe is first placed in contact with a measurement start point on the surface of the sample, and the amount of displacement of the probe, detected as the probe is moved in sliding fashion along the surface of the sample, is compared with the initial amount of displacement to determine whether the probe has reached the measurement end point.

BRIEF DESCRIPTION OF THE DRAWINGS

FIG. 11A is a diagram (part 1) explaining the method for determining the end of the measurement in the roundness measuring apparatus.

FIG. 11B is a diagram (part 2) explaining the method for determining the end of the measurement in the roundness measuring apparatus.

FIG. 11C is a diagram (part 3) explaining the method for determining the end of the measurement in the roundness measuring apparatus.

BEST MODE FOR CARRYING OUT THE INVENTION

Figure 1A:
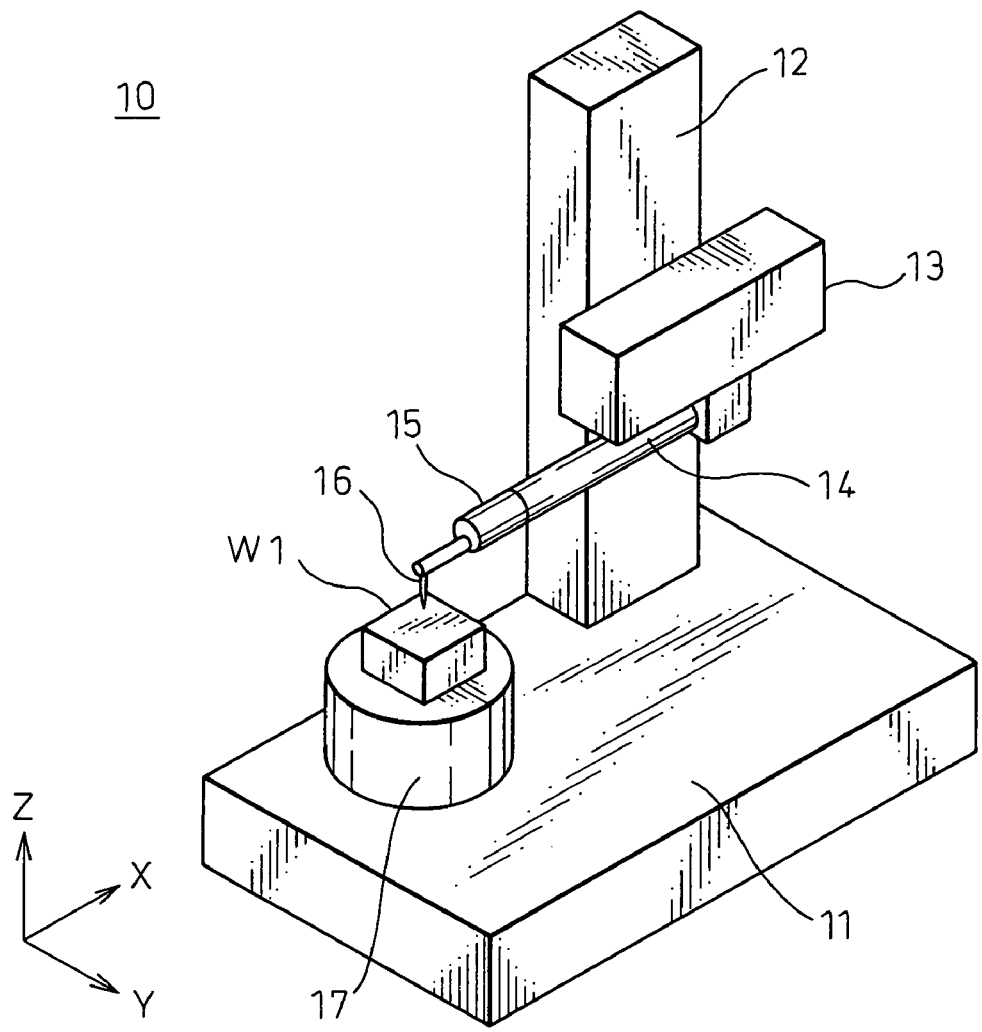
FIG. 1A is a diagram showing the basic configuration of a surface roughness/shape measuring apparatus.
Figure 5:
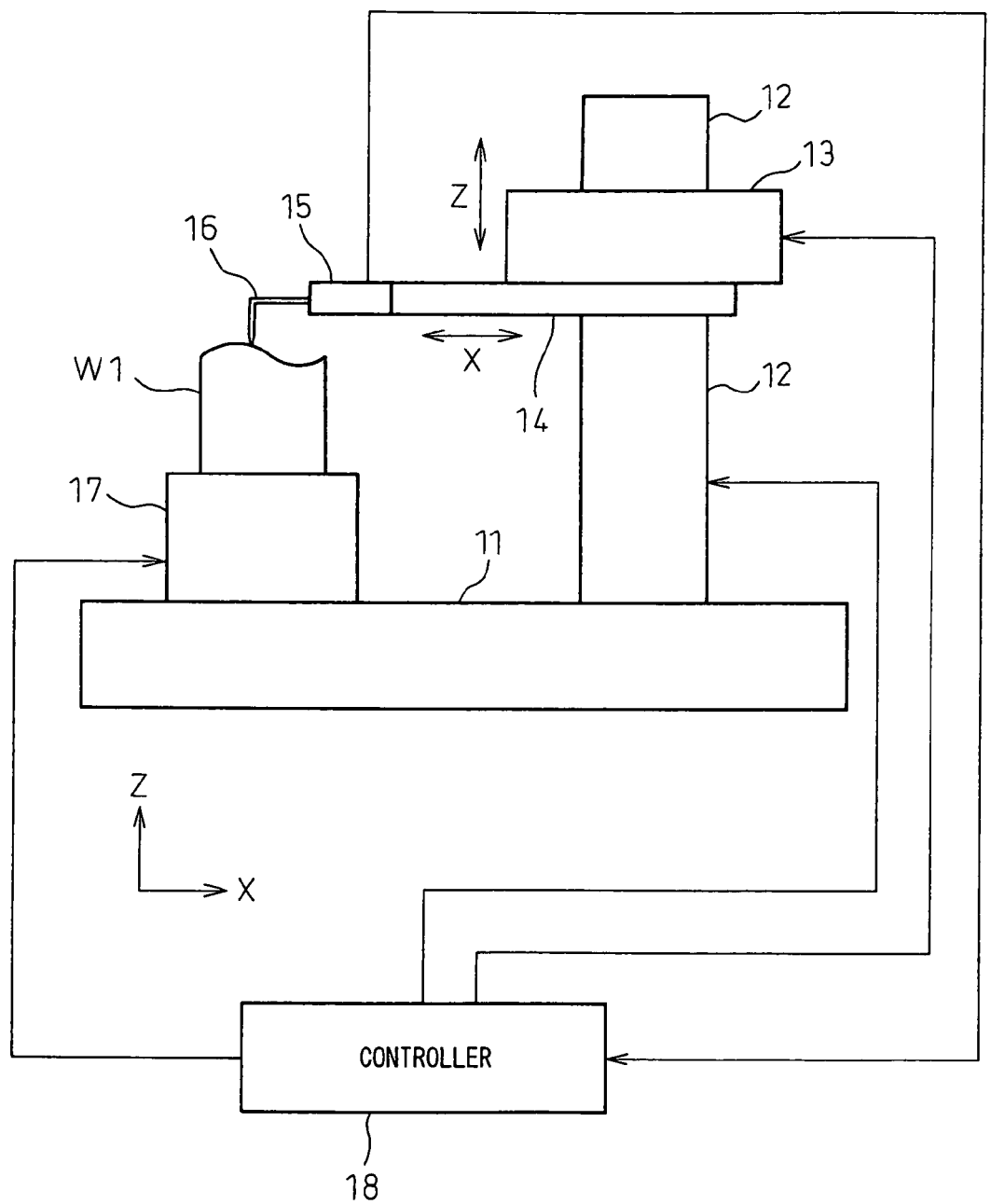
FIG. 5 is a diagram showing the general configuration of a surface roughness/shape measuring apparatus according to an embodiment of the present invention.

FIG. 5 is a diagram showing the general configuration of a surface roughness/shape measuring apparatus according to an embodiment of the present invention. The surface roughness/shape measuring apparatus 10, just like the configuration described with reference to FIG. 1A, comprises a base 11, a column 12 installed vertically on the base 11, a Z-direction moving part 13 slidably supported on the column 12, an X-arm 14 horizontally supported on the Z-direction moving part 13, a displacement detector 15 attached to the tip of the X-arm 14, a stylus 16 as a probe whose displacement in the Z-axis direction is detected by the displacement detector 15, and a work table 17, installed on the base 11, for mounting thereon a workpiece W1.

The surface roughness/shape measuring apparatus 10 further comprises a controller 18 which controls the measurement operation of the surface roughness/shape measuring apparatus 10 by outputting control signals to driving means for driving the various moving mechanisms such as the Z-direction moving part 13, the X-arm 14, and the work table 17, and which generates surface roughness or surface shape data of the measurement surface of the workpiece W1 based on a detection signal supplied from the displacement detector 15.

Figure 6:
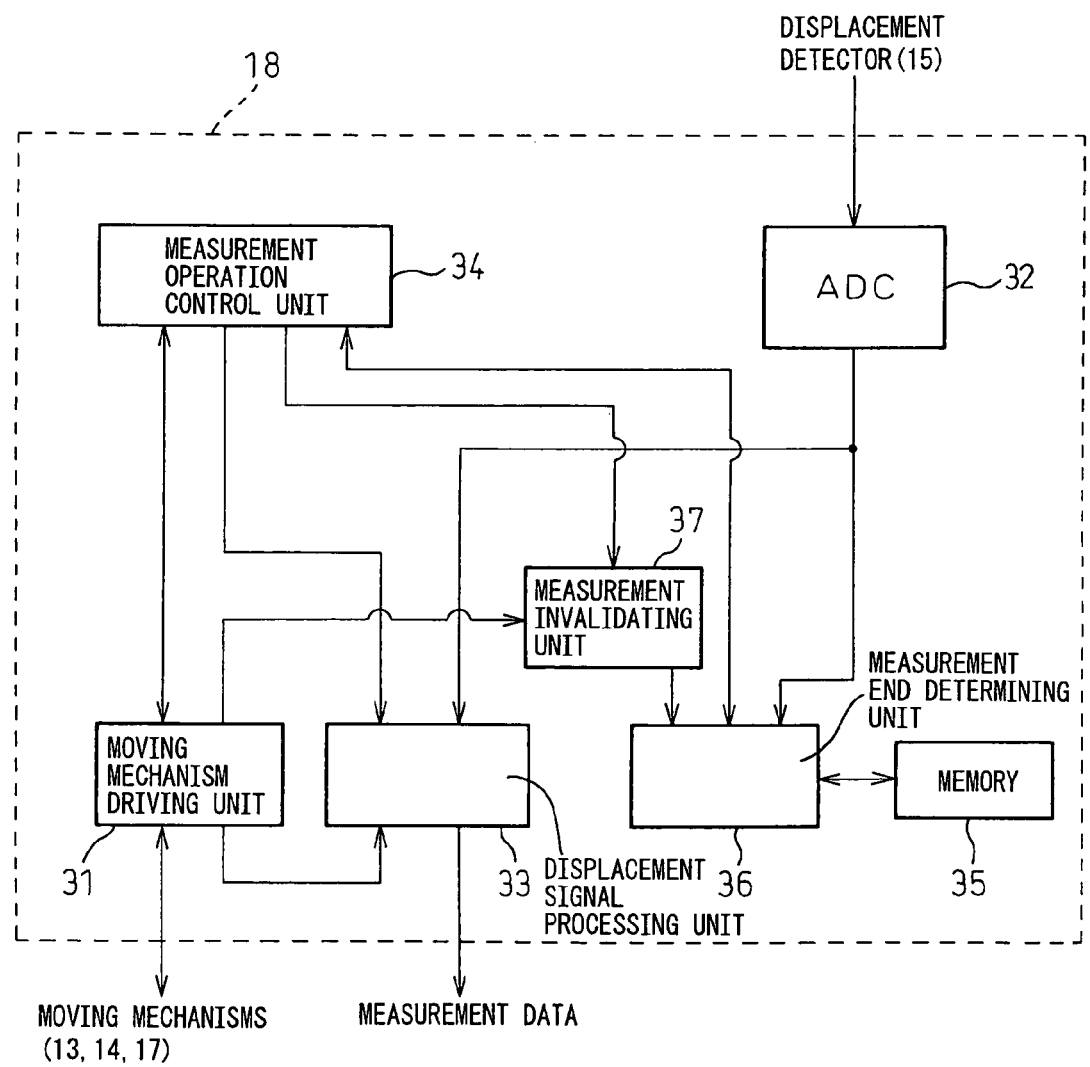
FIG. 6 is a block diagram showing in simplified form the configuration of a controller shown in FIG. 5.

FIG. 6 is a block diagram showing in simplified form the configuration of the controller 18 shown in FIG. 5. The controller 18 comprises a moving mechanism driving unit 31 which generates driving signals to the driving means for driving the various moving mechanisms such as the Z-direction moving part 13, the X-arm 14, and the work table 17, an analog-digital converter (ADC) 32 which converts the displacement signal of the stylus 16 detected by the displacement detector 15 into digital form by sampling it at a predetermined sampling rate, a displacement signal processing unit 33 which generates measurement data indicating a position in the Z-axis direction on the measurement surface of the workpiece W1 by associating the amount of displacement of the stylus 16 at each sampling time instant with the position information of the moving mechanisms (Z-direction moving part 13, X-arm 14, and work table 17) at that time instant, and a measurement operation control unit 34 which controls the moving mechanism driving unit 31 and the displacement signal processing unit 33.

When controlling the position of the stylus 16, the measurement operation control unit 34 determines its target position. The moving mechanism driving unit 31 determines the target positions of the Z-direction moving part 13 and the X-arm 14, respectively, that can achieve the determined target position of the stylus 16, and outputs driving signals for driving these moving mechanisms from their current positions to the respectively determined target positions. Further, when the operator places the stylus 16 at a measurement start position using a position input means not shown, and instructs the apparatus to start the measurement, the measurement operation control unit 34 outputs to the displacement signal processing unit 33 a measurement start signal for directing the start of the measurement.

The controller 18 further comprises a memory 35 which stores as the initial amount of displacement the amount of displacement of the stylus 16 detected by the displacement detector 15 when the measurement operation control unit 34 outputs the measurement start signal, a measurement end determining unit 36 which compares the amount of displacement of the stylus 16 detected during the measurement with the initial amount of displacement and determines whether the stylus 16 has reached a measurement end point, and a determination invalidating unit 37 which invalidates any determination made by the measurement end determining unit 36 until the stylus 16 is moved up to a predetermined distance from the start of the measurement. The measurement end determining method implemented by the controller 18 will be described below with reference to FIGS. 7 and 8.

Figure 7:
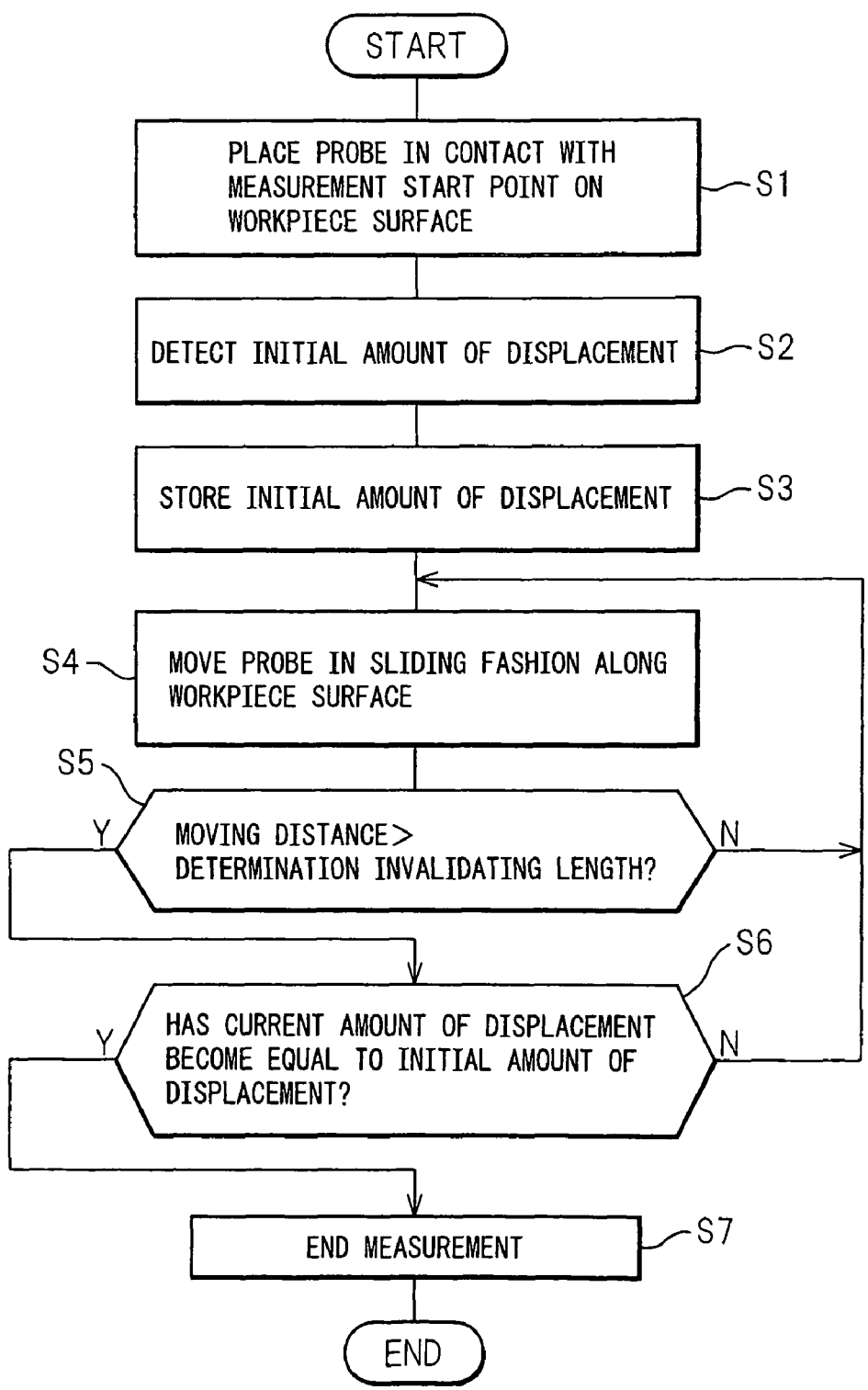
FIG. 7 is a flowchart of a measurement end determining method according to the present invention.
Figure 8:
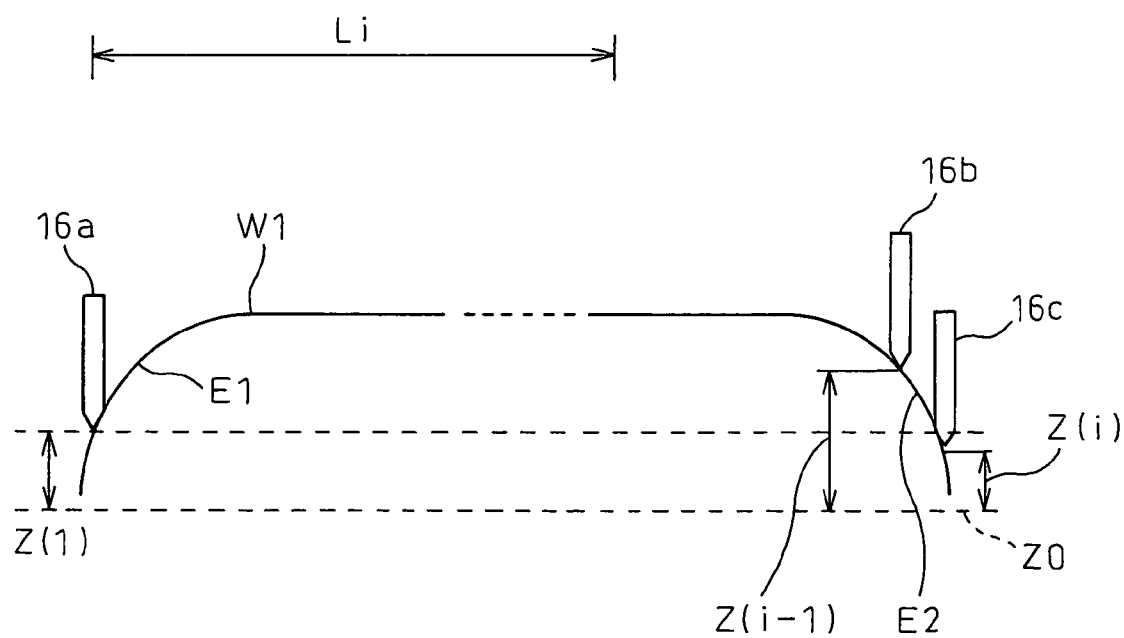
FIG. 8 is a diagram explaining the method for determining the end of the measurement in the surface roughness/shape measuring apparatus.

FIG. 7 is a flowchart of the measurement end determining method according to the present invention, and FIG. 8 is a diagram for explaining the method.

Figure 1B:
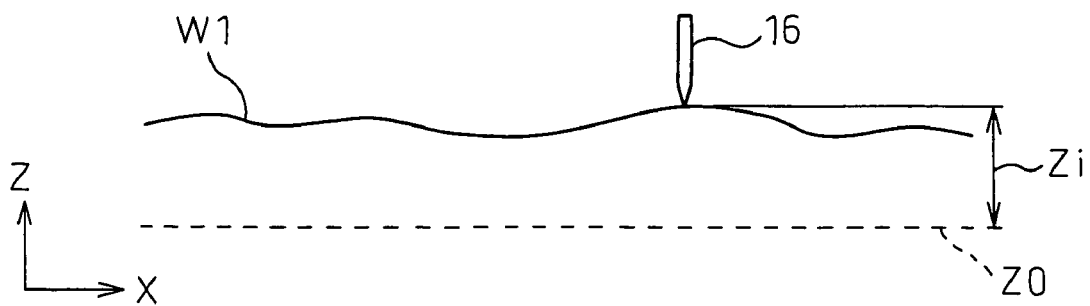
FIG. 1B is a diagram explaining the amount of displacement detected by a displacement detector.

In step S1, the operator who performs the measurement work places the stylus 16 in contact with the measurement start position on the workpiece W1 by using the position input means not shown, and thereafter the operator instructs the surface roughness/shape measuring apparatus 10 to start the measurement. FIG. 8 shows the condition in which the stylus indicated at reference numeral 16a is placed at the measurement start position located at the edge E1 of the workpiece W1. In FIG. 8, reference numeral Z0 indicates the reference position in the Z direction described with reference to FIG. 1B.

When the measurement start instruction is received from the operator, the measurement operation control unit 34 outputs the measurement start signal. The measurement end determining unit 36 that received the measurement start signal stores the amount of displacement of the stylus 16, detected at that time by the displacement detector 15, as the initial amount of displacement in the memory 35 (steps S2 and S3). In FIG. 8, the initial amount of displacement is indicated by reference numeral Z(1).

After that, in step S4, the stylus 16 is caused to move in sliding fashion along the measurement surface of the workpiece W1 by driving the X-arm 14 using the measurement operation control unit 34 and the moving mechanism driving unit 31.

In step S5, the determination invalidating unit 37 receives the amount of movement of the X-arm 14 from the moving mechanism driving unit 31, and detects the distance that the stylus 16 has moved along the measurement surface of the workpiece W1 from the start of the measurement until that time instant. Then, when the moving distance of the stylus 16 is not greater than the predetermined determination invalidating length Li, the determination invalidating unit 37 indicates to the measurement end determining unit 36 that the measurement end determination in the subsequent step S6 should be invalidated. As a result, the process does not proceed to the subsequent step S6, but returns to step S4 to continue to move the stylus 16.

On the other hand, when the moving distance of the stylus 16 is greater than the predetermined determination invalidating length Li, the measurement end determining unit 36 in step S6 determines whether the stylus 16 has reached the measurement end point by comparing the currently detected amount of displacement Z(i) of the stylus 16 with the initial amount of displacement Z(1).

In this case, when the following condition (1) is satisfied, the measurement end determining unit 36 may determine that the currently detected amount of displacement Z(i) of the stylus 16 has become equal to the initial amount of displacement Z(1), and therefore that the stylus 16 has reached the measurement end point.

$$(Z(i-1)-Z(i))\times(Z(i)-Z(1))\leq 0 \quad (1)$$

Here, Z(i) represents the amount of displacement detected by the displacement detector 15 when the stylus is located at the current position indicated at reference numeral 16c in FIG. 8, and Z(i−1) represents the amount of displacement detected by the displacement detector 15 when the stylus is located at a measurement position (indicated at reference numeral 16b) one position back from the current position.

If it is determined in step S6 that the stylus 16 has reached the measurement end point, the measurement end determining unit 36 sends a measurement end instruction to the measurement operation control unit 34 to end the measurement (step S7); on the other hand, if it is determined that the stylus 16 has not yet reached the measurement end point, the process returns to step S4 to continue the measurement.

Figure 2A:
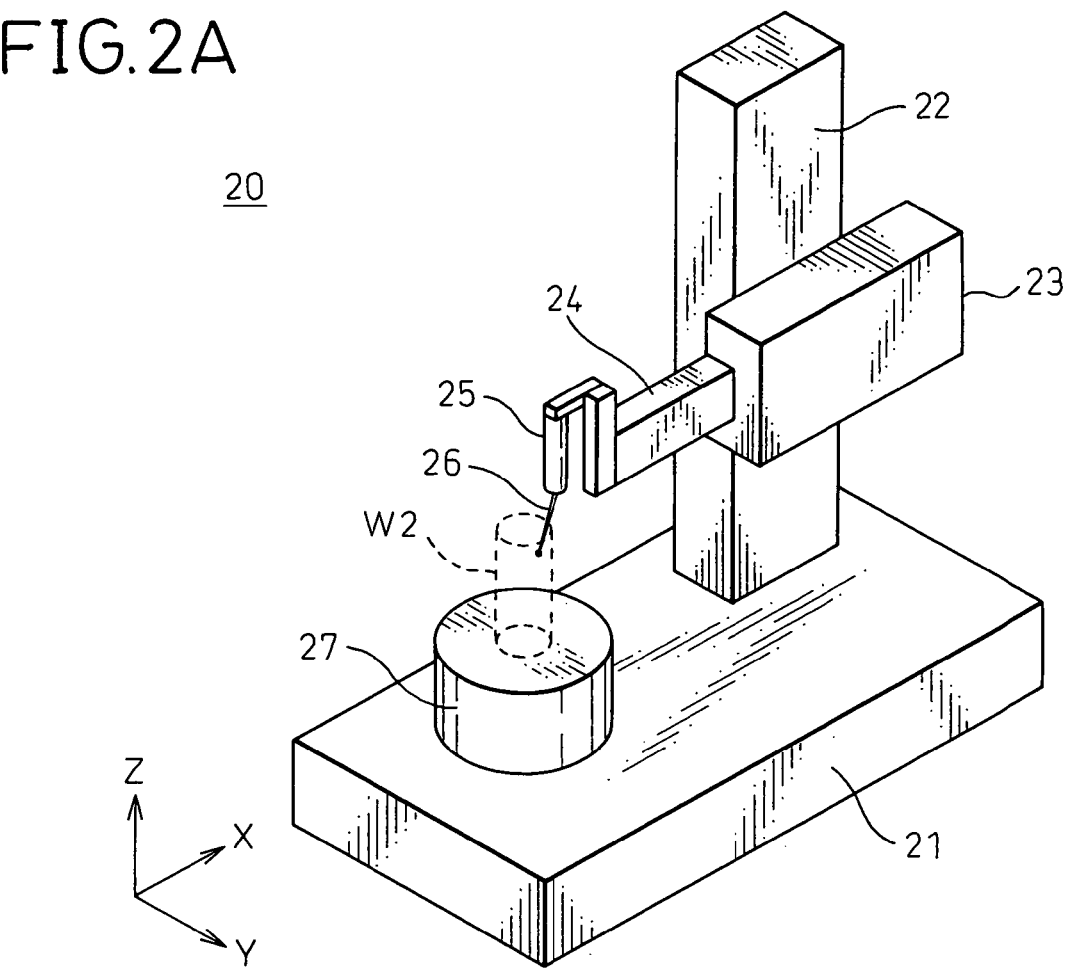
FIG. 2A is a diagram showing the basic configuration of a roundness measuring apparatus.
Figure 9:
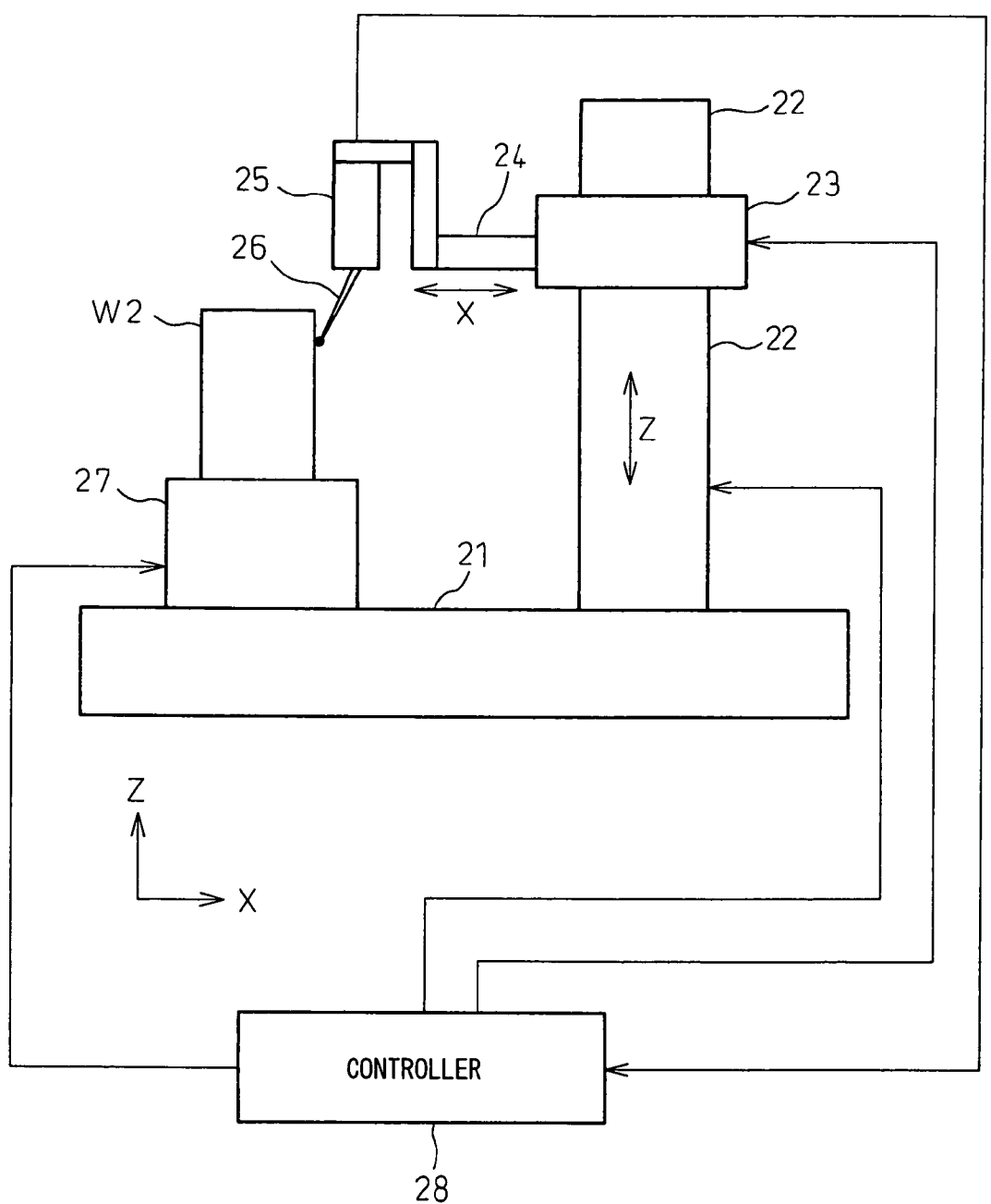
FIG. 9 is a diagram showing the general configuration of a roundness measuring apparatus according to an embodiment of the present invention.

FIG. 9 is a diagram showing the general configuration of a roundness measuring apparatus according to an embodiment of the present invention. The roundness measuring apparatus 20, just like the configuration described with reference to FIG. 2A, comprises a base 21, a column 22 installed vertically on the base 21, a Z-direction moving part 23 slidably supported on the column 22, an X-arm 24 horizontally supported on the Z-direction moving part 23, a displacement detector 25 attached to the tip of the X-arm 24, a turntable 27, installed on the base 21, for mounting thereon a workpiece W2, and a probe 26 which is pressed against a side face of the workpiece W2 mounted on the turntable 27 and whose displacement is detected by the displacement detector 25 as the workpiece W2 is rotated.

The roundness measuring apparatus 20 further comprises a controller 28 which controls the measurement operation of the roundness measuring apparatus 20 by outputting control signals to driving means for driving the various moving mechanisms such as the Z-direction moving part 23, the X-arm 24, and the turntable 27, and which computes, based on the detection signal from the displacement detector 25, the circumferential shape of the cross section of the workpiece W2 to determine the roundness of its arced portion.

Figure 10:
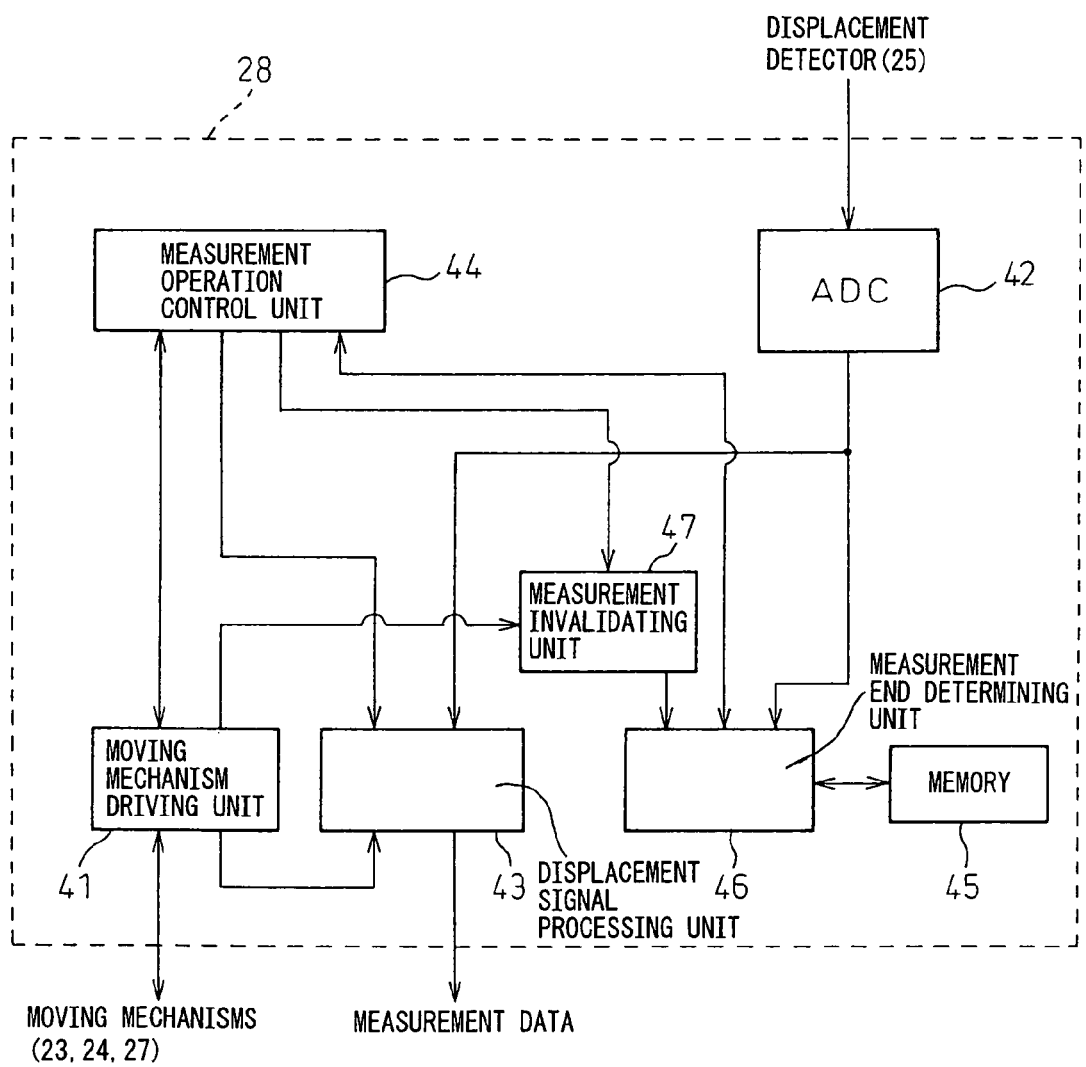
FIG. 10 is a block diagram showing in simplified form the configuration of a controller shown in FIG. 9.

FIG. 10 is a block diagram showing in simplified form the configuration of the controller 28 shown in FIG. 9. The controller 28 comprises a moving mechanism driving unit 41 which generates driving signals to the driving means for driving the various moving mechanisms such as the Z-direction moving part 23, the X-arm 24, and the turntable 27, an analog-digital converter (ADC) 42 which converts the displacement signal of the probe 26 detected by the displacement detector 25 into digital form by sampling it at a predetermined sampling rate, a displacement signal processing unit 43 which calculates the roundness by measuring the cross-sectional shape along the side face of the workpiece W2 by associating the amount of displacement of the probe 26 at each sampling time instant with the information representing the amount of rotation of the turntable 27 at that time instant, and a measurement operation control unit 44 which controls the moving mechanism driving unit 41 and the displacement signal processing unit 43.

When controlling the position of the probe 26, the measurement operation control unit 44 determines its target position. The moving mechanism driving unit 41 determines the target positions of the Z-direction moving part 23 and the X-arm 24, respectively, that can achieve the determined target position of the probe 26, and outputs driving signals for driving these moving mechanisms from their current positions to the respectively determined target positions. Further, the measurement operation control unit 44 determines the target rotation angle of the turntable 27 on which the workpiece W2 is mounted. The moving mechanism driving unit 41 outputs a driving signal for rotating the turntable 27 so that the thus determined target rotation angle of the turntable 27 can be achieved.

When the operator places the probe 26 at a measurement start position on the workpiece W2 by moving the probe 26 using a position input means not shown and by rotating the turntable 27, and instructs the apparatus to start the measurement, the measurement operation control unit 44 outputs to the displacement signal processing unit 43 a measurement start signal for directing the start of the measurement.

The controller 28 further comprises a memory 45 which stores as the initial amount of displacement the amount of displacement of the probe 26 detected by the displacement detector 25 when the measurement operation control unit 44 outputs the measurement start signal, a measurement end determining unit 46 which compares the amount of displacement of the probe 26 detected during the measurement with the initial amount of displacement and determines whether the probe 26 has reached a measurement end point, and a determination invalidating unit 47 which invalidates any determination made by the measurement end determining unit 46 until the turntable 27 is rotated by a predetermined angle from the start of the measurement. The measurement end determining method implemented by the controller 28 will be described below with reference to FIG. 7 in conjunction with FIGS. 11A to 11C.

In step S1 shown in FIG. 7, the operator who performs the measurement work places the probe 26 in contact with the measurement start position on the workpiece W2 by using the position input means not shown, and thereafter the operator instructs the roundness measuring apparatus 20 to start the measurement.

Figure 2B:
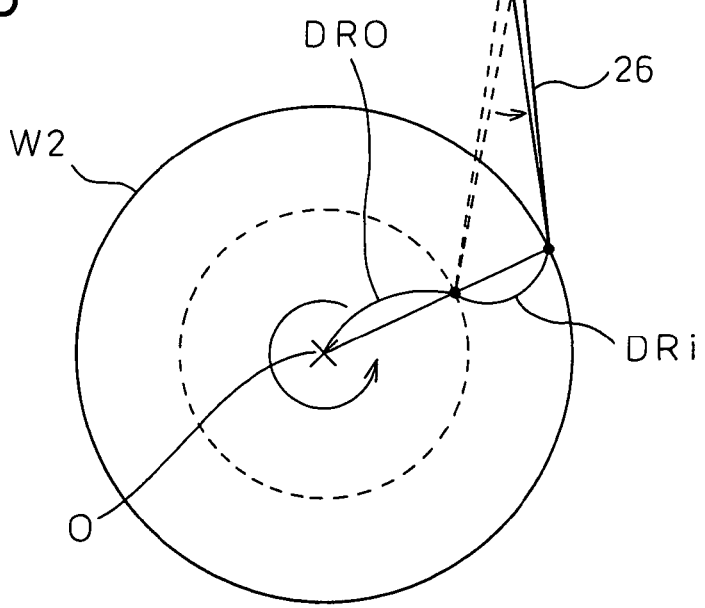
FIG. 2B is a diagram explaining the amount of displacement detected by a displacement detector.
Figure 3A:
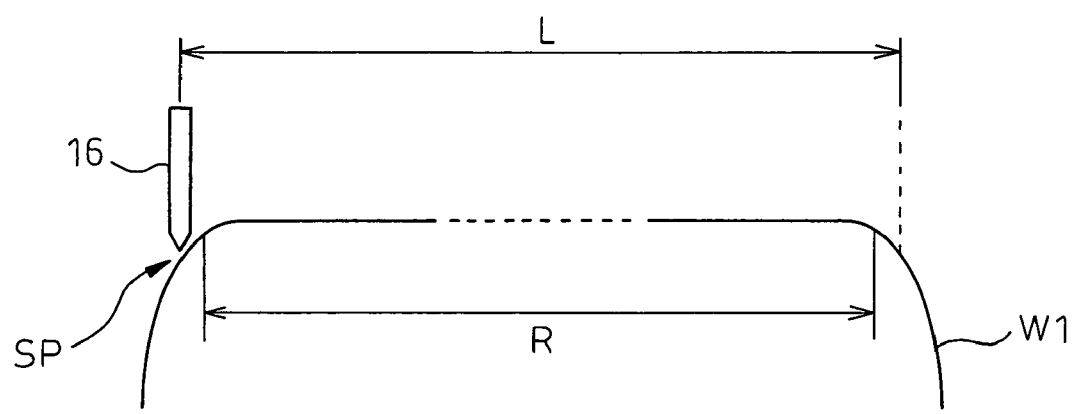
FIG. 3A is a diagram explaining a first example of a measurement end determining method.
Figure 3B:
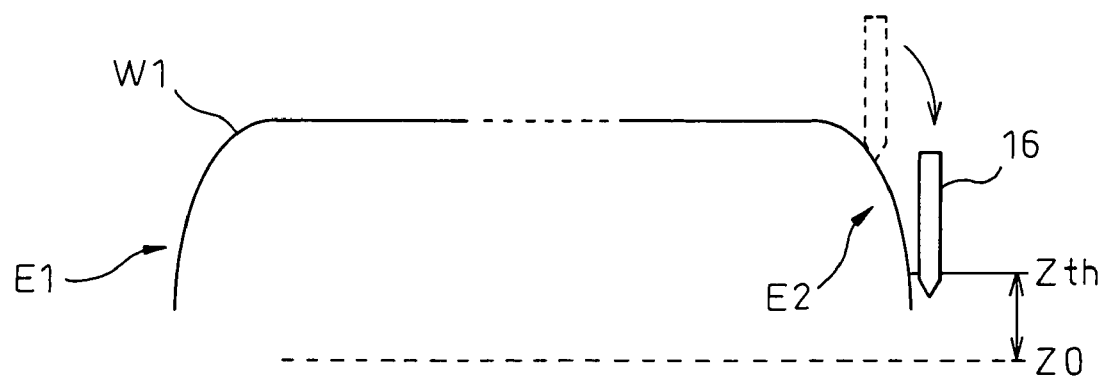
FIG. 3B is a diagram explaining a second example of a measurement end determining method.
Figure 4:
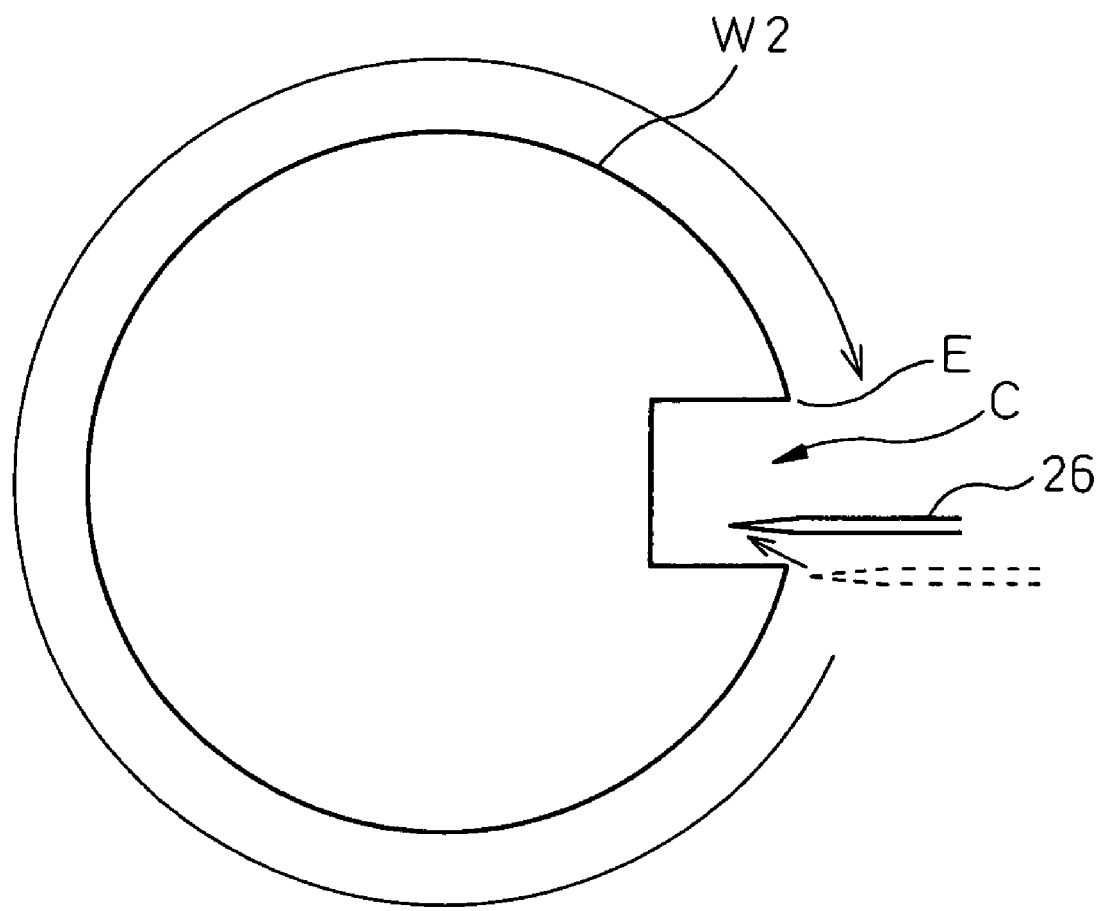
FIG. 4 is a diagram explaining the measurement of the roundness of a workpiece having a cut portion in its side face.

FIG. 11A is a diagram showing how the roundness of an arced portion A, which forms a portion of the cross-sectional circumference of the workpiece W2, is measured while rotating the workpiece W2 about the center O of the arc. FIG. 11B is an enlarged view of the portion B in FIG. 11A that contains an edge portion E1 where the measurement start point is located, and FIG. 11C is an enlarged view of the portion C in FIG. 11A that contains an edge portion E2 where the measurement end point is located. Reference character DR0 shown in FIGS. 11B and 11C indicates the position of the reference radius described with reference to FIG. 2B.

FIG. 11B shows the condition in which the probe indicated at reference numeral 26a is placed at the measurement start position located at the edge E1 of the workpiece W2.

When the measurement start instruction is received from the operator, the measurement operation control unit 44 outputs the measurement start signal. The measurement end determining unit 46 that received the measurement start signal stores the amount of displacement of the probe 26, detected at that time by the displacement detector 25, as the initial amount of displacement in the memory 45 (steps S2 and S3). In FIG. 11B, the initial amount of displacement is indicated by reference numeral DR(1).

After that, in step S4, the probe 26 is caused to move in sliding fashion along the measurement surface of the workpiece W2 by rotating the turntable 27 using the measurement operation control unit 44 and the moving mechanism driving unit 41.

In step S5, the determination invalidating unit 47 receives from the moving mechanism driving unit 41 the amount by which the turntable 27 has been rotated from the start of the measurement until that time instant. Then, when the amount of rotation of the turntable 27 is not greater than the predetermined determination invalidating angle θi, the determination invalidating unit 47 indicates to the measurement end determining unit 46 that the measurement end determination in the subsequent step S6 should be invalidated. As a result, the process does not proceed to the subsequent step S6, but returns to step S4 to continue to move the probe 26 along the measurement surface of the workpiece W2.

On the other hand, when the amount of rotation of the turntable 27 is greater than the predetermined determination invalidating angle θi, the measurement end determining unit 46 in step S6 determines whether the probe 26 has reached the measurement end point by comparing the currently detected amount of displacement DR(i) of the probe 26 with the initial amount of displacement DR(1).

In this case, when the following condition (2) is satisfied, the measurement end determining unit 46 may determine that the currently detected amount of displacement DR(i) of the probe 26 has become equal to the initial amount of displacement DR(1), and therefore that the probe 26 has reached the measurement end point.

$$(DR(i-1)-DR(i)) \times (DR(i)-DR(1)) \leq 0 \quad (2)$$

Here, DR(i) represents the amount of displacement detected by the displacement detector 25 when the probe is located at the current position indicated at reference numeral 26c in FIG. 11C, and DR(i−1) represents the amount of displacement detected the displacement detector 25 when the probe is located at a measurement position (indicated at reference numeral 26b) one position back from the current position.

If it is determined in step S6 that the probe 26 has reached the measurement end point, the measurement end determining unit 46 sends a measurement end instruction to the measurement operation control unit 44 to end the measurement (step S7); on the other hand, if it is determined that the probe 26 has not yet reached the measurement end point, the process returns to step S4 to continue the measurement.

According to the present invention, since there is no need to specify the measurement length along which the probe is to be moved for the measurement of a surface shape, the measurement work efficiency can be enhanced when measuring the surface shapes of a plurality of workpieces having different measurement ranges.

The present invention is applicable to a surface shape measuring apparatus, such as a surface roughness/shape measuring apparatus or a roundness measuring apparatus, that measures the surface shape of a sample by moving a probe in sliding fashion along the surface of the sample and thereby detecting the amount of displacement of the probe caused by irregularities on the surface.

While the present invention has been described in detail above with reference to the preferred embodiments, it should be understood by those skilled in the art that various modifications and changes can be made by anyone skilled in the art, and that all of such modifications and changes that come within the range of the true spirit and purpose of the present invention fall within the scope of the present invention as defined by the appended claims.

What is claimed is:

1. A surface shape measuring apparatus for measuring a surface shape of a sample by moving a probe in a sliding fashion along a surface of said sample to detect an amount of displacement of said probe caused by irregularities on said surface, said surface shape measuring apparatus comprising:

a displacement detector for detecting the amount of displacement of said probe; and a measurement end determining unit for determining whether said probe has reached a measurement end point by comparing the amount of displacement of said probe, detected as said probe is moved in the sliding fashion along the surface of said sample, with an initial amount of displacement of said probe detected when said probe was first placed in contact with a measurement start point on said surface.

2. The surface shape measuring apparatus as claimed in claim 1, wherein said measurement end determining unit is configured to determine that said probe has reached the measurement end point when the amount of displacement of said probe, detected as said probe is moved in the sliding fashion along said surface, has become substantially equal to said initial amount of displacement.

3. The surface shape measuring apparatus as claimed in claim 1, further comprising a determination invalidating unit for invalidating a determination made by said measurement end determining unit until said probe is moved up to a predetermined distance from the measurement start point.

4. The surface shape measuring apparatus as claimed in claim 1, wherein said surface shape measuring apparatus comprises a surface roughness/shape measuring apparatus which is configured to measure a surface roughness or the surface shape along the surface of said sample by moving said sample and said probe relative to each other in a predetermined direction and thereby detecting the amount of displacement of said probe in a direction perpendicular to said predetermined direction.

5. The surface shape measuring apparatus as claimed in claim 1, wherein said surface shape measuring apparatus comprises a roundness measuring apparatus which is configured to measure a roundness of said sample having a circular cross section by moving said sample and said probe relative to each other in a predetermined direction along a side face of said sample around said circular cross section, and thereby detecting the amount of displacement of said probe in a radial direction of said sample.

6. The method for determining whether or not a surface shape measurement has ended, in which a surface shape of a sample is measured by moving a probe in a sliding fashion along a surface of said sample and thereby detecting an amount of displacement of said probe caused by irregularities on said surface, wherein said method determines whether said probe being moved in the sliding fashion along the surface of said sample has reached a measurement end point, the method comprising:

detecting an initial amount of displacement which is the amount of displacement of said probe when said probe is first placed in contact with a measurement start point on the surface of said sample; and determining whether said probe has reached the measurement end point by comparing the amount of displacement of said probe, detected as said probe is moved in the sliding fashion along said surface, with said initial amount of displacement.

7. The method as claimed in claim 6, wherein said method determines that said probe has reached the measurement end point when the amount of displacement of said probe, detected as said probe is moved in the sliding fashion along said surface, has become substantially equal to said initial amount of displacement.

8. The method as claimed in claim 6, wherein a determination made as to whether said probe has reached the measurement end point is invalidated until said probe is moved up to a predetermined distance from the measurement start point.

9. The method as claimed in claim 6, wherein in said surface shape measurement, a surface roughness or the surface shape is measured along the surface of said sample by moving said sample and said probe relative to each other in a predetermined direction and thereby detecting the amount of displacement of said probe in a direction perpendicular to said predetermined direction.

10. The method as claimed in claim 6, wherein in said surface shape measurement, a roundness of said sample having a circular cross section is measured by moving said sample and said probe relative to each other in a predetermined direction along a side face of said sample, around said circular cross section, and thereby detecting the amount of displacement of said probe in a radial direction of said sample.

* * * * *